United States Patent [19]

Hosokawa et al.

[11] Patent Number: 4,735,858

[45] Date of Patent: Apr. 5, 1988

[54] HEAT-RESISTANT PREPREG AND METHOD FOR PRODUCTION THEREOF

[75] Inventors: Etsuo Hosokawa; Hiroshi Hashimoto, both of Yokohama, Japan

[73] Assignee: Showa Electric Wire & Cable Co., Ltd., Kawasaki, Japan

[21] Appl. No.: 886,794

[22] Filed: Jul. 18, 1986

[30] Foreign Application Priority Data

Jul. 19, 1985 [JP] Japan .................................. 60-159417
Jul. 10, 1986 [JP] Japan .................................. 61-162724

[51] Int. Cl.$^4$ .............................. B32B 9/00; B05D 3/02
[52] U.S. Cl. ..................................... 428/390; 427/387; 427/389; 427/389.8; 427/435; 428/365; 428/378; 428/379; 428/391; 428/392
[58] Field of Search ................... 427/387, 389.8, 389, 427/435; 252/62, 606; 428/365, 378, 379, 391, 392, 388, 389, 390, 383, 447

[56] References Cited

U.S. PATENT DOCUMENTS

| | | | |
|---|---|---|---|
| 4,152,509 | 5/1979 | Yajima et al. | 528/4 |
| 4,228,270 | 10/1980 | Kobayashi | 528/8 |
| 4,361,679 | 11/1982 | Yajima et al. | 528/5 X |
| 4,405,687 | 9/1983 | Morita et al. | 428/391 X |
| 4,460,639 | 7/1984 | Chi et al. | 427/387 X |

Primary Examiner—Thurman K. Page
Attorney, Agent, or Firm—Finnegan, Henderson Farabow, Garrett & Dunner

[57] ABSTRACT

A heat-resistant prepreg uses at a substrate a heat-resistant material made of heat-resistant organic fibers, inorganic fibers, etc. and as a matrix a heat-resistant mixture containing at least 10% by weight of a borosiloxane resin composition. This heat-resistant prepreg is obtained by impregnating the substrate at a temperature in the range of 200° to 300° C. to such an extent that at least 20% of the amount of phenyl groups bonded to silicon atoms in the aforementioned borosiloxane resin composition prior to the impregnating and drying steps will remain after the heat treatment.

6 Claims, 1 Drawing Sheet

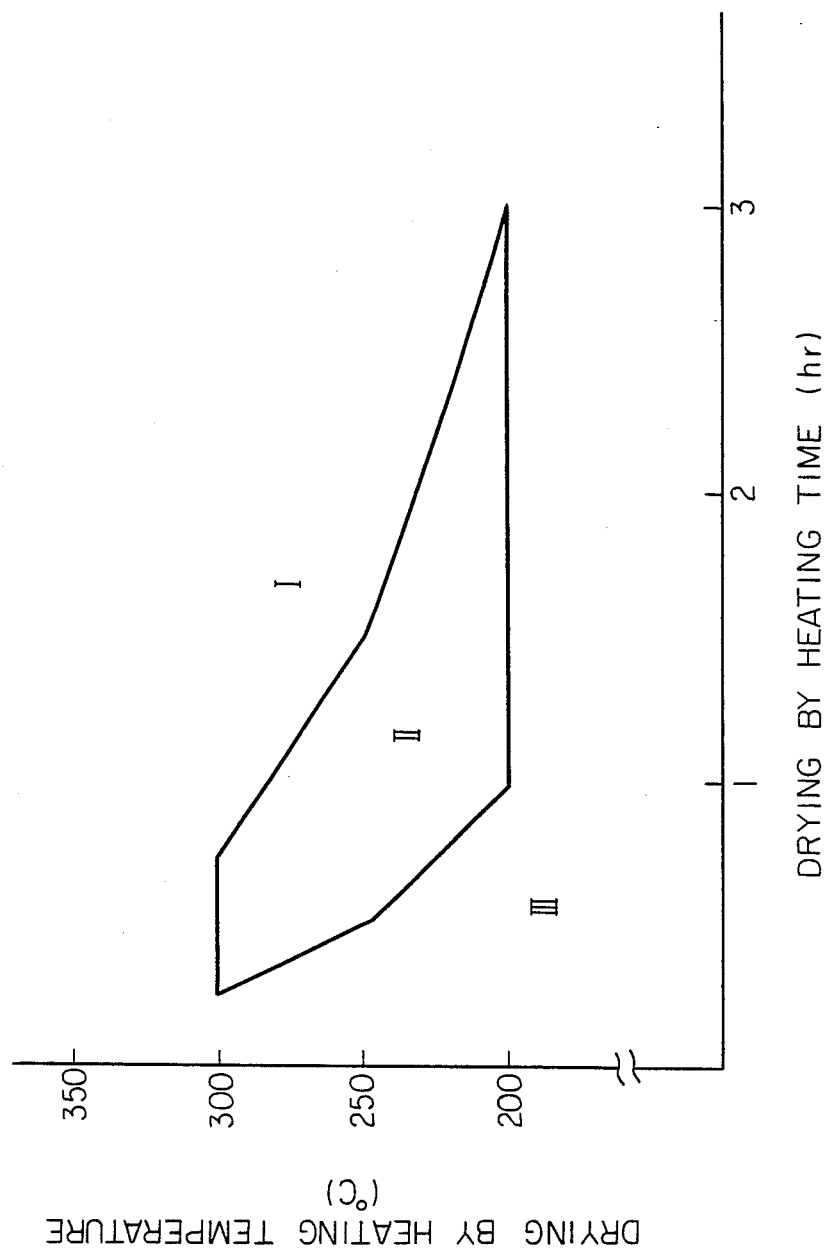

HEAT-RESISTANT PREPREG AND METHOD FOR PRODUCTION THEREOF

The present application claims piority of Japanese Patent Application Serial No. 60-159417 filed on July 19, 1985 and Serial No. 61-16274 filed on July 10, 1986.

FIELD OF THE INVENTION AND RELATED ART STATEMENT

This invention relates to a heat-resistant prepreg having a matrix formed by impregnating a heat-resistant substrate with a heat-resistant mixture comprising a borosiloxane resin composition.

In recent years, composite structural materials produced by impregnating inorganic and organic fibers having excellent thermal stability and strength such as glass fibers, carbon fibers and Kevlar fibers with unsaturated polyester resin or epoxy resin, on account of their light weight and great toughness, have come to find growing utility in structural members for sports goods, automobiles, aircraft and space vehicles which have been heretofore made of metallic materials. Separately, prepreg which are produced by preparatorily impregnating such substrate as mentioned above with epoxy resin, for example, and subsequently treating the impregnation products to a half-cured state, on account of their ease of handling and high workability, have come to be used as mutually superposed or joined fast to other substrates in increasingly numerous cases.

These prepregs, however, have their thermal stability determined by the thermal stability of such impregnating materials as epoxy resin and unsaturated polyester resin which are used as in impregnated while the thermal stability of such substrates as glass fibers, carbon fibers and Kevlar fibers is not directly harnessed in the composite materials. In the case of prepreg products using epoxy resin, for example, their working temperatures are limited to 120° C. Beyond this temperature, they are not usable.

As high-temperature heat-resistant composite materials, FRM's using carbon fibers, silicon carbide fibers, alumina fibers and metallic fibers as substrates and alumina and other metals as materixes have come to attract growing attention. Of course, they cannot be joined without an adhesive agent and cannot be used in the form of prepregs. These composite materials are expensive and adoptable only for special applications.

OBJECT AND SUMMARY OF THE INVENTION

This invention has been produced for the purpose of solving the problems described above. It aims to provide a heat-resistant prepregs which can be satisfactorily used at high temperatures even exceeding 200° C. at no sacrifice of adhesive property.

To be specific, this invention is directed to a heat-resistant prepreg obtained by impregnating a heat-resistant substrate with a heat-resistant mixture as a matrix comprising at least 10% by weight of a borosiloxane resin composition and the balance to make up 100% by weight of a heat-resistant resin, and subjecting the resulting impregnation product to a heat treatment in such a manner that at least 20% of the amount of phenyl groups bonded to the silicon atoms in the borosiloxane resin composition prior to the impregnating, heating and drying steps will remain after the heat treatment and a method for the production of the prepreg.

BRIEF DESCRIPTION OF THE DRAWING

Figure shows the relation between the temperature and the time determined in the heat treatment of a substrate impregnated with a heat-resistant mixture containing a borosiloxane resin composition.

DETAILED DESCRIPTION OF PREFERRED EMBODIMENTS

Now, the present invention will be described in detail below.

As examples of the heat-resistant substrate usable for this invention, liquid crystal polymer fibers such as Nomex and Kevlar (products of Dupont Co.), Xydar (product of Dartco Co.), and Vectra (product of Celanese Co.); carbon fibers; inorganic fibers such as silicon carbide fibers; alumina fibers, and boron nitride fibers; metallic fibers, and mixed fibers thereof may be cited. The choice among these fibers is made in the light of the degree of thermal stability required by the product. As concerns the form of the heat-resistant substrate, any form selected from among threads, non-woven fabrics, woven fabrics, papers, etc. can be adopted.

The borosiloxane resin composition which is chiefly used in the heat-resistant mixture destined to constitute three matrix of the prepreg is a polycondensate obtained by subjecting the following three components, (A), (B), and (C), to a reaction at a temperature in the range of 50° to 800° C.:

(A) An organic silicon compound represented by the general formula, $R_2SiX_2$, (wherein R stands for a methyl group or a phenyl group and X for a hydroxyl group or a halogen), (B) one boron compound selected from among boric acid, boric anhydride, and boric esters, and (C) a silicone oil having a viscosity of at least 1.0 cSt at 25° C., which is either dimethyl silicone oil or phenyl-methyl silicone oil, which polycondensate contains the following structural unit in the structure thereof:

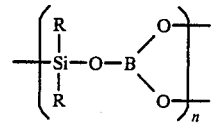

(wherein R stands for a methyl group or phenyl group and n for the degree of polymerization).

When the substituent R in the compound of (A) is a methyl group, the polycondensate enjoys satisfactory thermal stability but suffers from high susceptibility to hydrolysis. When it is a phenyl group, the polycondensate enjoys improvement the behavior in hydrolysis. Thus, the phenyl group is generally selected. As the substrate X, the hydroxyl group is preferably selected because of greater ease of synthesis. It is permissible to use as the starting material a dichlorosilane which has chlorine as a halogen component.

While the boron compound of (B) can be selected from among boric acid, boric anhydride, and boric esters, it is desirable to adopt boric acid because of ease of synthesis.

As the silicone oil of (C), either of methyl silicone oil and phenyl silicone oil can be used. The selected silicone oil is desired to have a vicosity of not less than 1.0 cSt, preferably not less than 10 cSt.

The reaction of the foregoing three components, (A)+(B)+(C), is carried out at a temperature in the range of 50° to 800° C., preferably 50° to 600° C. The water produced during this reaction and any excess silicone oil are removed from the reaction system.

The heat-resistant resin to be used as mixed with the borosiloxane resin composition can be selected from among silicon resin, polyimide, polyamideimide, aromatic polyamides, polyether sulfone, polyetherether keton, polysulfone, polyphenylene sulfide, polyphenylene oxide, polycarbonate, and phenol resin.

The mixture of the heat-resistant resin with the borosiloxane resin composition is effected by first dissolving the two components separately in their respective suitable solvents and subsquently blending the resulting solutions. The borosiloxane resin composition is easily soluble in n-methyl pyrrolidone and is allowed to incorporate therein such an aromatic solvent as toluene or xylene and ethyl alcohol.

The impregnating mixture for the production of the prepreg can be prepared by intimately mixing the n-methyl pyrrolidone solution of the borosiloxane resin composition with the xylene solution of a silicon resin, for example.

Alternatively, the impregnating mixture can be prepared in the form of a suspension by dispersion the heat-resistant resin finely comminuted in advance in the solution of the borosiloxane resin composition.

In the heat-resistant impregnating mixture for the preparation of the prepreg of this invention, the content of the borosiloxane resin composition is required to be not less than 10% by weight based on the solids content of the mixture. If the content is less than 10% by weight, the resulting impregnating mixture acquires no sufficient thermal stability. Specifically, the heat-resistant resin, though enjoying a satisfactory initial adhesive property, undergo deterioration after a protracted standing at high temperatures to the extent of hardening, gaining in brittleness, and suffering from ready separation.

The heat-resistant mixture which comprises the borosiloxane resin composition can be used in combination with various inorganic fillers and coloring agents. As concrete examples of the inorganic filler, there can be cited glass powder mica, talc, kaoline, metal oxide such as aluminum oxide, and magnesium oxide; metal carbides such as silicon carbide, and tungsten carbide; and metal nitrides such as silicon nitride, titanium nitride, and boron nitride.

Then, the impregnation of the heat-resistant substrate with the mixture predominantly comprising the borosiloxane resin composition as contemplated by the present invention is accomplished by any of the conventional methods available for the kind of impregnation involved herein. The heat-resistant substrate is thermally dried, vacuum dried, and cleaned for the removal of foreign matter and moisture. It may be given a surface treatment as with a silane coupling agent, for example, when necessary for the impartation of adhesiveness.

The heat-resistant substrate which has undergone the pretreatment described above is impregnated with the mixture by dipping, vacuum impregnation, or some other suitable methods of impregnation and then is dried by heating.

The drying by the heating is required to be carried out at a temperature of not less than 200° C. and more than 300° C. If this temperature is less than 200° C., since the solvent to be used during the impregnation is n-methyl pyrrolidone or xylene having a high boiling point, the solvent persists in the prepreg after the step of drying and the residual solvent, during the superposition of two or more prepregs or the thermal adhesion of one prepreg to some other substrate, volatilizes and impedes the desired adhesion. If the temperature exceeds 300° C., although the presistence of the solvent is no longer involved, the bond of silicon atoms to the phenyl group or methyl group in the borosiloxane resin composition is broken and the resin composition is consequently converted into ceramic so that, during the superposition of two or more prepregs or the adhesion of one prepreg to some other substrate, the resin composition can degrade the adhesion.

The Figure illustrates the relation between the temperature and the time determined in the heat treatment performed on a substrate impregnated with a heat-resistant containing the borosiloxane resin composition.

In the Figure the region II is a region in which appropriate production conditions are shown, the region I a region of excessive drying, and the region III a region of insufficient drying.

When a sample taken from the impregnated part of a prepreg obtained under the aforementioned drying conditions is analyzed with an infrared spectrum with respect to the condition of bond between silicon atoms and phenyl groups, it is demonstrated that the prepreg exhibits sufficient adhesive property when the absorbance, $\delta_o$, at 700 cm$^{-1}$, of the borosiloxane resin composition before the drying and the absorbance, $\delta_a$, at 700 cm$^{-1}$, of the same resin composition after the drying satisfy the following realtion.

$$\delta_a/\delta_o \geqq 0.2$$

Table 1 shows the results of an experiment which comprised impregnating alumina ceramic papers 500 μm in thickness with a heat-resistant mixture containing a borosiloxane resin composition, heating the resulting impregnation products under varying condition thereby preparing prepreg papers reflecting such varying heating conditions, superposing these prepreg papers one each on stainless steel sheets of SUS 304 under simultaneous application of heat and pressure, and measuring the tensile shear strengths of the applied prepreg papers to test for adhesive strength.

TABLE 1

|   | $\delta_a/\delta_o$ | Tensile shear strength (kg/cm$^2$) |
|---|---|---|
| 1 | 0.3 | 60 |
| 2 | 0.7 | 63 |
| 3 | 1.0 | 75 |
| 4 | 0.1 | 9 |

It is noted from Table 1 that for the sake of the adhesive property of the prepreg, at least 20% of the amount of the bond of silicon atoms to phenyl groups in the borosiloxane resin is retained after the step of drying by heating. When the prepreg in the shape of a strip is to be continuously impregnated and dried, it becomes necessary for the drying by heating to be effected in a relatively short span of time and the oven to be used for this heating in the continuous operation inevitably has a wide temperature distribution. Thus, there are times when the heating time indicated in the Figure cannot be necessarily retained. In any event, however, the temperature of this heating is required to be at least 200° C. and to be not more than 300° C.

Now this invention will be described specifically below with reference to working examples.

Examples 1–7

Preparation of borosiloxane resin composition

In a flask, 432 g of diphenyl silane diol, 83 g of boric acid, and 255 g of dimethyl silicone oil of 10 cst were stirred under a current of nitrogen gas and, at the same time, gradually heated from room temperature to 400° C. over a period of 6 hours.

Then, the mixture was heated and stirred at 400° C. for 1 hour to be polycondensed.

After the water formed during the reaction and the unaltered dimethyl silicone oil were removed, there was obtained 525 g of a borosiloxane resin composition. This composition was dissolved in n-methyl pyrrolidone to prepare a 50% solution. This solution and a xylene 50% silicone resin solution (product of Toshiba Silicone Co., LTD. and marketed under product code of "TSR-116") were mixed in the proportions of solid weight ratio indicated in Example 1–7 of Table 2, to prepare mixtures containing the borosiloxane resin composition.

As a substrate, ceramic papers 500 μm in thickness formed preponderantly of alumina fibers were used. These ceramic papers were heated at 300° C. for 1 hour to expel the organic binder. They were then impregnated with the aforementioned mixtures containing the borosiloxane resin composition. The drying of the impregnated substrates was carried out in a constant temperature air over under the varying conditions shown in Table 2.

The prepregs consequently obtained were cut into strips 20 mm in width and 50 mm in length and the strips were subjected to the following tests.

(1) Test for self-adhesiveness

Two strips of a given sample were joined to each other in an area 20 mm in width and 30 mm in length, nipped between two metal sheets, and heated at 300° C. for 30 minutes under a pressure of 10 kg/cm². The bound strips were left cooling to room temperature and used as a specimen for the test. This specimen was left standing in an air constant temperature over at 200° C. for 500 hours, removed from the bath, and left cooling. The opposite ends of the specimen were pulled away from each other with a tensile tester until the strips of the specimen were separated. The strength at which the separation was made was reported as tensile shear strength.

(2) Test for adhesiveness with stainless steel sheet

A stainless steel sheet 0.5 mm in thickness (SUS 304) was cut into strips 20 mm in width and 50 mm in length. The strips of stainless steel and the same strips of prepreg as used in (1) were joined each pair in an area 20 mm in width and 30 mm in length. The specimen so prepared was nipped between metal sheets and heated at 300° C. for 30 minutes under a pressure of 10 kg/cm². The specimen was left standing in an air constant-temperature oven at 250° C. for 500 hours, then removed from the bath, and left cooling. The opposite ends of the specimen were pulled away from each other with a tensile tester to test for tensile shear strength.

Comparative Experiments 1, 2, and 3 were equivalents to Example 3, except that the same mixture as used in Example 3 was under varying heating conditions of 150° C.×4 hours, 250° C.×2 hours, and 350° C.×0.25 hour respectively.

Comparative Experiment 4 is an equivalent to Examples 1–5, except that silicone resin containing absolutely no borosiloxane resin composition was used. Comparative Experiment 5 represents a modification in which epoxy resin was used as an impregnating mixture and the drying by heating was carried out at 140° C. for 0.5 hour. The results are shown in Table 2. It is noted from Table 2 that total loss of adhesiveness was found in the test performed after the deterioration by heating in Comparative Experiments 4 and 5. From the results of Comparative Experiments 1 and 3, it is noted that in Comparative Experiment 1 in which the drying was effected at a temperature of less than 100° C. and Comparative Experiment 3 in which the drying was effected at a temperature exceeding 300° C., the initial adhesive property and the adhesive property after deterioration by heating were both extremely poor. In Comparative Experiment 2, the ratio of $\delta_a/\delta_o$ was less than 20% because of excessive heating and, as a result, the peel strength after deterioration by heating was insufficient.

In Example 1–7 in which the borosiloxane resin composition contents were invariably not less than 10% by weight, the adhesive strengths, both self-adhesion and adhesion with stainless steel (SUS 304), were varied very little before and after the heating high temperature.

Examples 8–17

The same tests as in Examples 1–7 were carried out by following the procedure of Example 1–7, except that impregnating mixtures were prepared by adding 50% by weight of a varying heat-resistant resin indicated to Table 3 to 50% by weight of the same borosiloxane resin composition.

From the test results given in Table 3, it is noted that the mixture showed satisfactory adhesive property even after heating.

TABLE 2

|  |  | Example |  |  |  |  |  |  | Comparative Experiment |  |  |  |  |
|---|---|---|---|---|---|---|---|---|---|---|---|---|---|
|  |  | 1 | 2 | 3 | 4 | 5 | 6 | 7 | 1 | 1 | 3 | 4 | 5 |
| Composition of mixture (% by weight) | Borosiloxane resin | 10 | 30 | 50 | 70 | 90 | 50 | 50 | 50 | 50 | 50 | 0 | — |
|  | Silicone resin | 90 | 70 | 50 | 30 | 10 | 50 | 50 | 50 | 50 | 50 | 100 | — |
|  | Epoxy resin | — | — | — | — | — | — | — | — | — | — | — | 100 |
| Condition for drying by heating | °C. | 250 | 250 | 250 | 250 | 250 | 300 | 200 | 150 | 250 | 350 | 250 | 140 |
|  | × | × | × | × | × | × | × | × | × | × | × | × | × |
|  | n | 1 | 1 | 1 | 1 | 1 | 0.5 | 2 | 4 | 2 | 0.25 | 1 | 0.5 |
| $\delta_a/\delta_o$ |  | 0.6 | 0.7 | 0.7 | 0.8 | 0.7 | 0.3 | 0.8 | 1.0 | 0.1 | 0.1 |  |  |
| Tensile shear | Self- Original | 99 | 82 | 74 | 50 | 36 | 73 | 76 | 32 | 41 | 12 | 110 | 205 |

TABLE 2-continued

|  |  |  | Example |  |  |  |  |  |  | Comparative Experiment |  |  |  |  |
|---|---|---|---|---|---|---|---|---|---|---|---|---|---|---|
|  |  |  | 1 | 2 | 3 | 4 | 5 | 6 | 7 | 1 | 2 | 3 | 4 | 5 |
| strength (kg/cm²) | adhesion | After 500 hrs' heating at 200° C. | 92 | 79 | 71 | 49 | 35 | 70 | 74 | 25 | 18 | 7 | 0 | 0 |
|  | Adhesion with SUS 304 | Original | 65 | 54 | 49 | 33 | 23 | 48 | 48 | 15 | 20 | 5 | 70 | 101 |
|  |  | After 500 hrs' heating at 200° C. | 64 | 53 | 47 | 31 | 21 | 46 | 45 | 11 | 15 | 2 | 0 | 0 |

TABLE 3

|  |  |  | Example |  |  |  |  |  |  |  |  |  |
|---|---|---|---|---|---|---|---|---|---|---|---|---|
|  |  |  | 8 | 9 | 10 | 11 | 12 | 13 | 14 | 15 | 16 | 17 |
| Composition of mixture (% by weight) | Borosiloxane resin |  | 50 | 50 | 50 | 50 | 50 | 50 | 50 | 50 | 50 | 50 |
|  | Polyimide resin |  | 50 |  |  |  |  |  |  |  |  |  |
|  | Polyamideimide resin |  |  | 50 |  |  |  |  |  |  |  |  |
|  | Polyether sulfone resin |  |  |  | 50 |  |  |  |  |  |  |  |
|  | Polyether ether keton resin |  |  |  |  | 50 |  |  |  |  |  |  |
|  | Aromatic polyamide resin |  |  |  |  |  | 50 |  |  |  |  |  |
|  | Polyallylate resin |  |  |  |  |  |  | 50 |  |  |  |  |
|  | Polyphenylene sulfide resin |  |  |  |  |  |  |  | 50 |  |  | 25 |
|  | Modified polyphenylene oxide resin |  |  |  |  |  |  |  |  | 50 |  |  |
|  | Polycarbonate resin |  |  |  |  |  |  |  |  |  | 50 |  |
|  | Polysulfone resin |  |  |  |  |  |  |  |  |  |  | 25 |
| Condition for drying by heating | °C. × n |  | 250×1 | 250×1 | 250×1 | 250×1 | 250×1 | 250×1 | 250×1 | 250×1 | 250×1 | 250×1 |
| Tensile shear strength (kg/cm²) | Self-adhesion | Original | 78 | 77 | 52 | 49 | 75 | 74 | 51 | 49 | 48 | 52 |
|  |  | After 500 hrs' heating at 200° C. | 75 | 76 | 49 | 48 | 70 | 69 | 48 | 47 | 45 | 49 |
|  | Adhesion with SUS 304 | Original | 51 | 50 | 35 | 33 | 50 | 48 | 33 | 33 | 31 | 36 |
|  |  | After 500 hrs' heating at 200° C. | 47 | 47 | 31 | 31 | 47 | 46 | 31 | 31 | 30 | 32 |

What is claimed is:

1. A heat-resistant prepreg comprising a heat-resistant substrate impregnated with a heat-resistant mixture, the heat-resistant mixture comprising at least 10% by weight of a borosiloxane resin composition and a heat-resistant resin in an amount to make up 100% by weight, at least 20% of the amount of phenyl groups bonded to silicon atoms in said borosiloxane resin composition prior to impregnating and drying being still present after heat treatment at a temperature of not less than 200° C. and not more than 300° C.

2. A heat-resistant prepreg according to claim 1, wherein said borosiloxane resin composition is obtained by subjecting:
   (A) an organic silicon compound represented by the general formula, $R_2SiX_2$, (wherein R stands for a methyl group or a phenyl group and X for a hydroxy group or a halogen atom),
   (B) one boron compound selected from among boric acid, boric annydride, and boric esters, and
   (C) a silicone oil selected between dimethyl silicone oil and phenyl silicone oil and having a viscosity of at least 1.0 cSt at 25° C.,
to a polycondensation reaction at a temperature in the range of 50° to 800° C.

3. A heat-resistant prepreg according to claim 1, wherein said heat-resistant resin contained in said heat-resistant mixture is silicone resin.

4. A heat-resistant prepreg according to claim 1, wherein said heat-resistant substrate is formed of alumina fibers.

5. A method for the production of a heat-resistant prepreg, comprising the steps of
   (a) impregnating a heat-resistant substrate with a heat-resistant mixture composed of at least 10% by weight of a borosiloxane resin composition and a heat-resistant resin in an amount to make up 100% by weight, and
   (b) drying by heating the resulting impregnated substrate at a temperature of not less than 200° C. and not more than 300° C. to such an extent that at least 20% of the amount of phenyl groups bonded to the silicon atoms in said borosiloxane resin composition prior to the impregnating and drying steps remain after said heat treatment.

6. A method according to claim 5, wherein said borosiloxane resin composition is obtained by subjecting:
   (A) diphenyl silane diol,
   (B) boric acid, and
   (C) methyl silicone oil or phenyl silicone oil having a viscosity of not less than 1.0 cSt at 25° C.
to polycondensation at a temperature in the range of 50° to 800° C.

* * * * *